United States Patent
Bang

(10) Patent No.: US 8,854,522 B2
(45) Date of Patent: Oct. 7, 2014

(54) DIGITAL PHOTOGRAPHING APPARATUS AND CONTROL METHOD THEREOF, AND COMPUTER-READABLE MEDIUM

(75) Inventor: Hyo-sang Bang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 651 days.

(21) Appl. No.: 12/956,107

(22) Filed: Nov. 30, 2010

(65) Prior Publication Data

US 2011/0128431 A1    Jun. 2, 2011

(30) Foreign Application Priority Data

Nov. 30, 2009 (KR) ..................... 10-2009-0116843

(51) Int. Cl.
    *H04N 5/222*      (2006.01)
    *H04N 5/232*      (2006.01)
    *G06F 3/0488*      (2013.01)
    *G06F 1/16*      (2006.01)
    *H04N 7/14*      (2006.01)

(52) U.S. Cl.
    CPC ............ *H04N 5/232* (2013.01); *G06F 3/04883* (2013.01); *H04N 5/23216* (2013.01); *G06F 1/1692* (2013.01); *H04N 5/23293* (2013.01)
    USPC ............ 348/333.01; 348/14.03; 348/E05.022

(58) Field of Classification Search
    CPC ............ H04N 5/23293; H04N 5/2356; H04N 5/23212
    USPC ........... 348/14.03, 14.07, 14.11, 333.01, 349, 348/564, 840, E05.022, E5.104
    See application file for complete search history.

(56) References Cited

U.S. PATENT DOCUMENTS

| | | | | |
|---|---|---|---|---|
| 5,467,102 A * | 11/1995 | Kuno et al. | ..................... | 345/1.3 |
| 7,016,704 B2 * | 3/2006 | Pallakoff | ....................... | 455/566 |
| 8,194,043 B2 * | 6/2012 | Cheon et al. | .................. | 345/173 |
| 8,353,814 B2 * | 1/2013 | Villafana et al. | ................ | 600/36 |
| 8,643,617 B2 * | 2/2014 | Kim et al. | ..................... | 345/173 |
| 2006/0264243 A1 * | 11/2006 | Aarras | ........................ | 455/566 |
| 2007/0232336 A1 * | 10/2007 | Kim et al. | ..................... | 455/466 |
| 2009/0201260 A1 * | 8/2009 | Lee et al. | ...................... | 345/173 |
| 2009/0213081 A1 * | 8/2009 | Case, Jr. | ......................... | 345/173 |
| 2010/0005390 A1 * | 1/2010 | Bong | ............................ | 715/702 |
| 2013/0300909 A1 * | 11/2013 | Naick et al. | .............. | 348/333.02 |

* cited by examiner

*Primary Examiner* — Hung Lam
(74) *Attorney, Agent, or Firm* — Drinker Biddle & Reath LLP

(57) ABSTRACT

A method for controlling a digital photographing apparatus, which includes first and second display units, includes the operations of mapping at least one function to the second display unit, and performing the at least one function in response to a gesture input. The method may further include the operation of displaying a hotkey image, which represents the at least one function, on the second display unit.

44 Claims, 13 Drawing Sheets

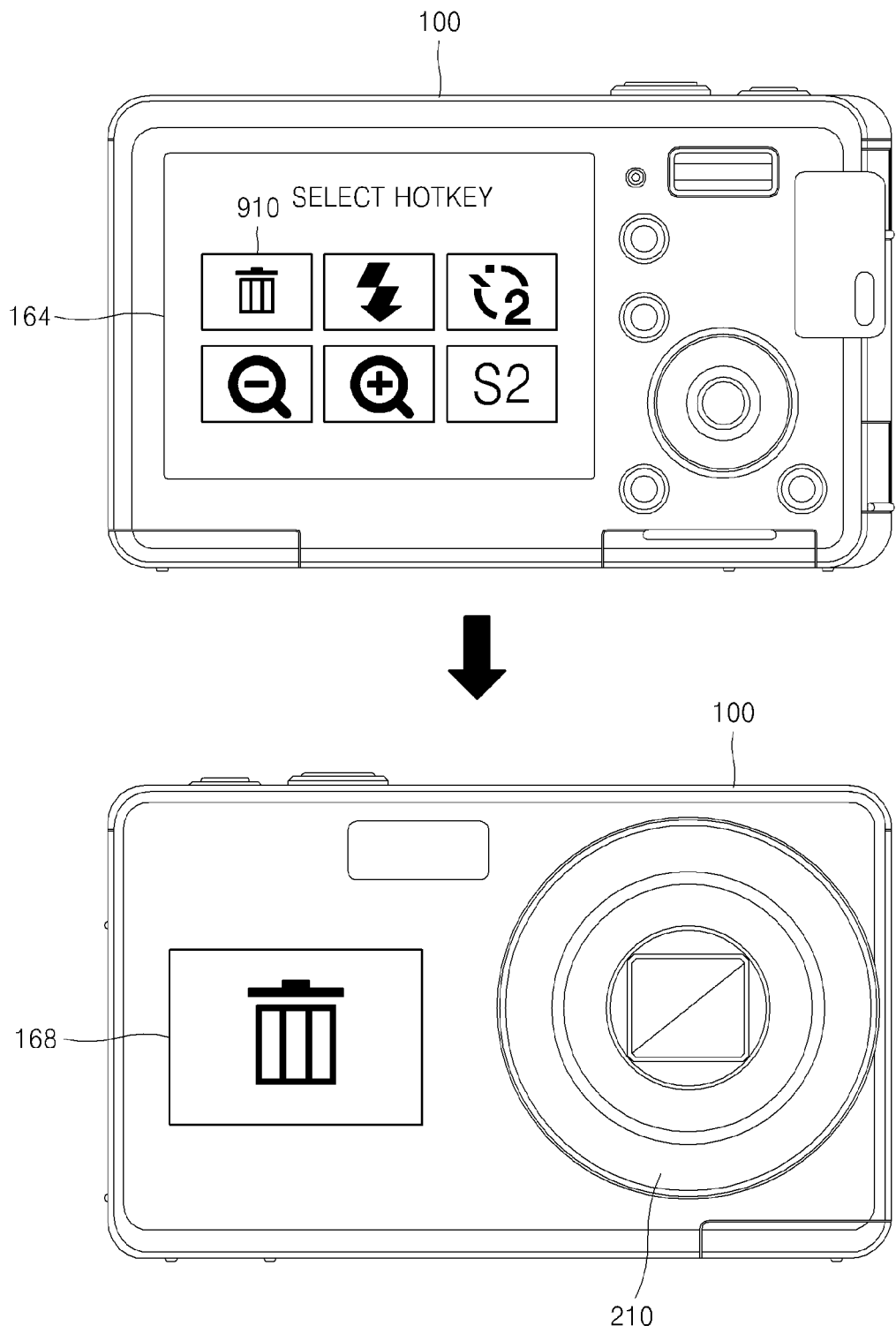

DIGITAL PHOTOGRAPHING APPARATUS AND CONTROL METHOD THEREOF, AND COMPUTER-READABLE MEDIUM

CROSS-REFERENCE TO RELATED PATENT APPLICATION

This application claims the priority benefit of Korean Patent Application No. 10-2009-0116843, filed on Nov. 30, 2009, in the Korean Intellectual Property Office, the disclosure of which is incorporated herein in its entirety by reference.

BACKGROUND

1. Field of the Invention

Embodiments relate to a digital photographing apparatus which can display images on a plurality of display units, a method for controlling the digital photographing apparatus, and a computer-readable medium which stores a computer program for executing the method.

2. Description of the Related Art

A digital photographing apparatus includes a display unit, and displays a live view image that displays in real time an image input to an imaging device, a captured image (or a quick view image) that displays an image captured by the imaging device, and a playback image that is stored in the storage medium of the digital photographing apparatus. Generally, a user interface such as Graphical User Interface (GUI) that enables users to manipulate the digital photographing apparatus is provided through a display unit that is disposed at the rear surface of the digital photographing apparatus.

SUMMARY

Embodiments of a digital photographing apparatus include a plurality of display units. The embodiments facilitate a user to control the digital photographing apparatus to perform a specific function by inputting a simple gesture.

According to an embodiment, a method for controlling a digital photographing apparatus, which includes first and second display units, includes the operations of mapping at least one function to the second display unit, and performing the at least one function in response to a gesture input. The method may further include the operation of displaying a hotkey image, which represents the at least one function, on the second display unit.

The method may further include the operation of providing a user interface through which a user selects the at least one function mapped to the second display unit among a plurality of functions of the digital photographing apparatus.

The method may further include the operation of displaying a description of a pre-defined type of the gesture input for performing the at least one function, on at least one of the first and second display units.

The method may further include displaying information of a function mapped to the second display unit on the first display unit.

The gesture input may include at least one of a pre-defined type of touch screen input which is input to the second display unit, a certain or higher level of pressure which is applied to the second display unit, and a pre-defined type of motion of the digital photographing apparatus.

The at least one function may include at least one of playback image deletion, playback image zooming out, playback image zooming in, playback image change, flash turn-on/off control, self-timer control, zoom in, zoom out, half-shutter button press input and shutter-release input.

The second display unit may be disposed at a front surface of the digital photographing apparatus in which a lens barrel is disposed, and the first display unit may be disposed at a rear surface of the digital photographing apparatus.

According to another embodiment, a method for controlling a digital photographing apparatus, which includes first and second display units, includes the operations of determining at least one function to be mapped to the second display unit, based on an operation mode of the first display unit, and mapping the at least one function to the second display unit.

The method may further include the operation of performing the at least one function in response to a gesture input.

The method may further include the operation of displaying a hotkey image, which represents the at least one function, on the second display unit.

The operation of determining the at least one function may include determining a shutter-release function to be mapped to the second display unit, when the first display unit operates in a photographing mode.

The operation of determining the at least one function may include determining a timer setting function to be mapped to the second display unit, when the first display unit operates in a self-timer photographing mode.

According to another embodiment, a digital photographing apparatus includes: a photographing unit that generates an electrical signal from incident light to photograph a subject; a first display unit; a second display unit; a function mapping unit that maps at least one function to the second display unit; and a controller that performs the at least one function in response to a gesture input.

The digital photographing apparatus may further include a user interface providing unit that provides a user interface through which a user selects the at least one function mapped to the second display unit among a plurality of functions of the digital photographing apparatus.

The function mapping unit may display a hotkey image, which represents the at least one function, on the second display unit.

The function mapping unit may display a description of a pre-defined type of the gesture input for performing the at least one function, on at least one of the first and second display units.

The function mapping unit may display information of a function, which is mapped to the second display unit, on the first display unit.

The second display unit may include a touch screen, and the gesture input may be a pre-defined type of touch screen input which is input to the second display unit. The second display unit may include a pressure sensor, and the gesture input may be a certain or higher level of pressure which is applied to the second display unit. The digital photographing apparatus may further include a motion sensor that senses a motion of the digital photographing apparatus, wherein the gesture input may be a pre-defined type of motion of the digital photographing apparatus.

The at least one function may be at least one of playback image deletion, playback image zooming out, playback image zooming in, playback image change, flash turn-on/off control, self-timer control, zoom in, zoom out, half-shutter button press input and shutter-release input.

The second display unit may be disposed at a front surface of the digital photographing apparatus in which a lens barrel is disposed, and the first display unit may be disposed at a rear surface of the digital photographing apparatus.

According to another embodiment, a digital photographing apparatus includes: a photographing unit that generates an electrical signal from incident light to photograph a subject; a first display unit; a second display unit; a function determination unit that determines at least one function to be mapped to the second display unit, based on an operation mode of the first display unit; and a function mapping unit that maps the at least one function to the second display unit.

The digital photographing apparatus may further include a control unit that performs the at least one function in response to a gesture input.

The function mapping unit may display a hotkey image, which represents the at least one function, on the second display unit.

The function determination unit may determine a shutter-release function to be mapped to the second display unit, when the first display unit operates in a photographing mode.

The function determination unit may determine a timer setting function to be mapped to the second display unit, when the first display unit operates in a self-timer photographing mode.

According to another embodiment, a non-transitory computer-readable storage medium may have stored thereon a program executable by a processor for performing a method of controlling a digital photographing apparatus which includes first and second display units. The method may include mapping at least one function to the second display unit, and performing the at least one function in response to a gesture input.

BRIEF DESCRIPTION OF THE DRAWINGS

The above and other features and advantages will become more apparent by describing in detail exemplary embodiments with reference to the attached drawings in which:

FIG. 9 is a diagram illustrating an exemplary form of a user interface which may select at least one function to be mapped to the second display unit;

DETAILED DESCRIPTION

Exemplary embodiments will now be described more fully with reference to the accompanying drawings. The following description and the accompanying drawings are for understanding the operations of the invention, and a portion that can easily be understood to those of ordinary skill in the art will be omitted.

Moreover, the specification and the accompanying drawings are not provided for the purpose of limitation, and the spirit and scope of the invention should be defined by the appended claims. In the specification, terms should be interpreted as meanings and concepts suitable for the spirit and scope of the invention in order to most appropriately express the invention.

Hereinafter, embodiments will be described with reference to the accompanying drawings.

Figure 1:
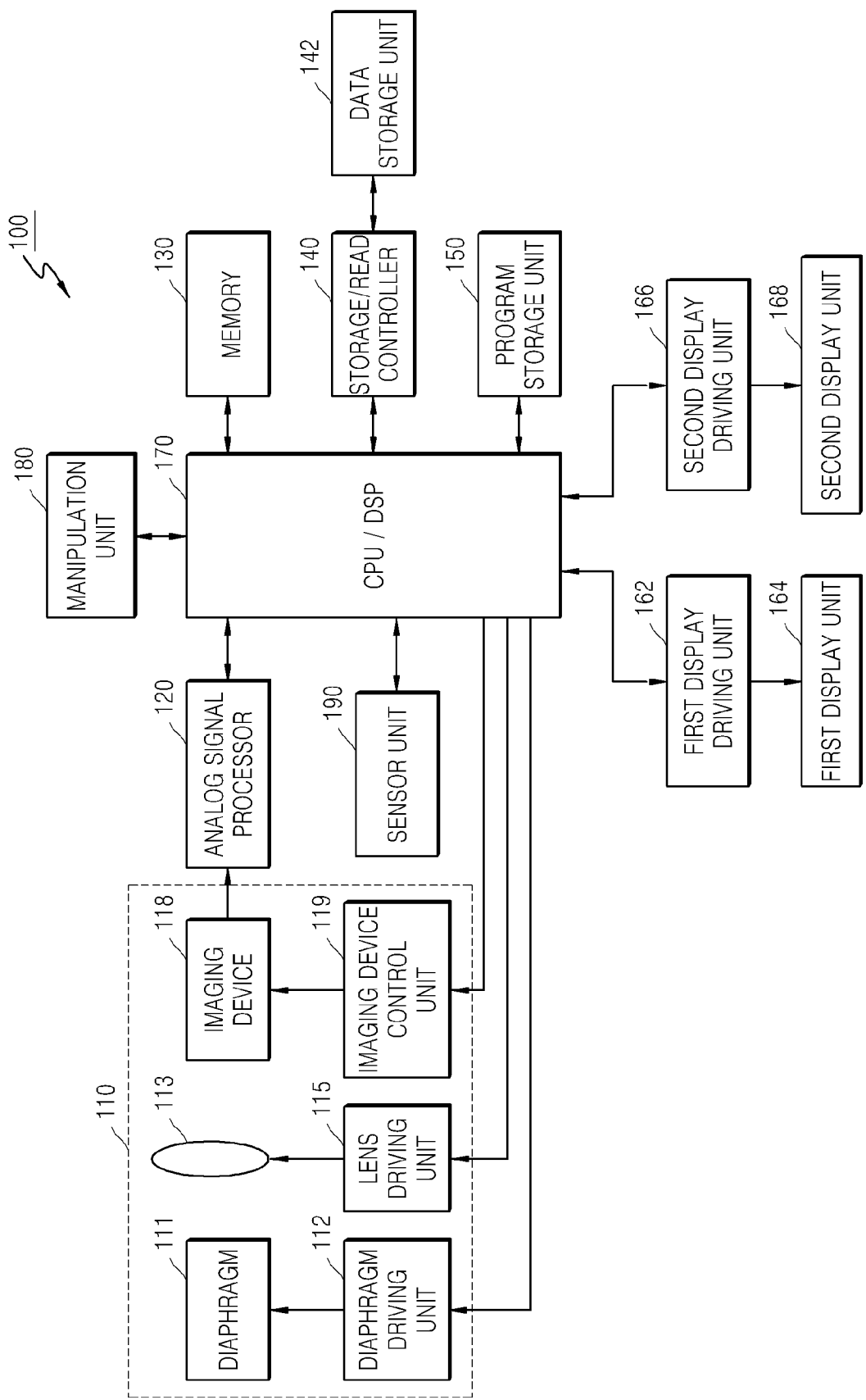
FIG. 1 is a block diagram illustrating an exemplary structure of a digital photographing apparatus, according to an embodiment.

FIG. 1 is a block diagram illustrating an exemplary structure of a digital photographing apparatus, according to an embodiment.

A digital photographing apparatus 100 according to an embodiment may include a photographing unit 110, an analog signal processor 120, a memory 130, a storage/read controller 140, a data storage unit 142, a program storage unit 150, a first display driving unit 162, a first display unit 164, a second display driving unit 166, a second display unit 168, a Central Processing Unit (CPU)/Digital Signal Processor (DSP) 170, a manipulation unit 180, and a sensor unit 190.

The overall operation of the digital photographing apparatus 100 is controlled and managed by the CPU/DSP 170. The CPU/DSP 170 provides a control signal for controlling the operation of each element, including a control signal to a diaphragm driving unit 112, a lens driving unit 115 and an imaging device control unit 119.

As an element for generating an electrical signal of the image from incident light, the photographing unit 110 includes a diaphragm 111, the diaphragm driving unit 112, a lens 113, the lens driving unit 115, an imaging device 118 and an imaging device control unit 119.

A degree of opening/shutting of the diaphragm 111 is controlled by the diaphragm driving unit 112, and the diaphragm driving unit 112 controls the amount of light incident to the imaging device 118.

The lens 113 may include a plurality of lenses such as a zoom lens and a focus lens. The position of the lens 113 is controlled by the lens driving unit 115. The lens driving unit 115 controls the position of the lens 113 according to the control signal provided from the CPU/DSP 170.

An optical signal that passes through the diaphragm 111 and the lens 113 is transferred to the light-receiving surface of the imaging device 118 and forms the image of a subject. The imaging device 118 may be a Complementary Metal Oxide Semiconductor Image Sensor (CIS) or a Charge Coupled Device (CCD) that converts an optical signal into an electrical signal. The sensitivity of the imaging device 118 may be controlled by the imaging device control unit 119. The imaging device control unit 119 may control the imaging device 118 according to a control signal that is automatically generated by an image signal which is input in real time or a control signal that is manually input according to the manipulation of a user.

The exposure time of the imaging device 118 is controlled by a shutter (not shown). The shutter (not shown) may be a mechanical shutter or an electronic shutter. The mechanical shutter may move a shade to control the input of light, and the electronic shutter may supply an electrical signal to the imaging device 118 to control exposure.

The analog signal processor 120 performs decreasing noise, controlling a gain, standardizing a waveform and analog-to-digital conversion, for an analog signal that is supplied from the imaging device 118.

A signal processed by the analog signal processor 120 may be input to the CPU/DSP 170 through the memory 130, or may be input to the CPU/DSP 170 without passing through the memory 130. Herein, the memory 130 operates as the main memory of the digital photographing apparatus 100, and temporarily stores desired information while the CPU/DSP 170 is operating. The program storage unit 150 stores programs such as an operating system and an application system for driving the digital photographing apparatus 100.

Furthermore, the digital photographing apparatus 100 includes the first and second display units 164 and 168 for displaying an operation state thereof or image information that is photographed in the digital photographing apparatus 100. The first and second display units 164 and 168 may provide visual information and/or auditory information to a user. For providing visual information, for example, the first and second display units 164 and 168 may include a Liquid Crystal Display (LCD) panel or an Organic Light Emitting Diode display (OLED) panel. Moreover, each of the first and second display units 164 and 168 may be a touch screen capable of recognizing a user's touch as an input.

The first and second display driving units 162 and 166 provide driving signals to the first and second display units 164 and 168, respectively. Although FIG. 1 illustrates a block diagram in which the first and second display driving units 162 and 164 are separately configured, this should not be construed as limiting. The first and second display driving units 162 and 166 may integrally be configured as an exemplary embodiment.

The CPU/DSP 170 processes an input image signal, and controls each element according to an external input signal. The CPU/DSP 170 may decrease noise for an input image data, and may perform image signal processing such as gamma correction, color filter array interpolation, color matrix, color correction and color enhancement, for improving image quality. Moreover, the CPU/DSP 170 may process an image signal for improving image quality to generate an image data and compress the image data, thereby generating an image file. Alternatively, the CPU/DSP 170 may restore the image data from the image file. An image compression scheme may be a reversible scheme or an irreversible scheme. As an example of an appropriate compression scheme, conversion may be performed in a Joint Photographic Experts Group (JPEG) scheme or a JPEG 2000 scheme.

The image data output from the CPU/DSP 170 may be input through the memory 130 or may be directly input to the storage/read controller 140. The storage/read controller 140 stores the image data in the data storage unit 142 according to a signal from a user or automatically. Moreover, the storage/read controller 140 may read data for an image from an image file that is stored in the data storage unit 142, and may input the read data to the first display driving unit 162 or the second display driving unit 166 through the memory 130 or another path, thereby allowing an image to be displayed on the first display unit 164 or the second display unit 168. The data storage unit 142 may be detachable, or may be permanently mounted on the digital photographing apparatus 100.

Moreover, the CPU/DSP 170 may perform unclearness processing, color processing, blur processing, edge emphasis processing, image analysis processing, image recognition processing and image effect processing. The CPU/DSP 170 may perform face recognition and scene recognition processing as image recognition processing. Furthermore, the CPU/DSP 170 may perform display image signal processing for displaying images on the first and second display units 164 and 168. For example, the CPU/DSP 170 may perform brightness level control, color correction, contrast control, contour emphasis control, screen segmentation processing, character image generation and images combination. The CPU/DSP 170 may be connected to an external monitor and perform image signal processing for an image to be displayed on the external monitor. The CPU/DSP 170 may transmit the processed image data, thereby allowing a corresponding image to be displayed on the external monitor.

Moreover, the CPU/DSP 170 executes a program that is stored in the program storage unit 150. Alternatively, by including a separate module, the CPU/DSP 170 generates a control signal for controlling auto focusing, zoom change, focus drift and auto exposure correction and provides the control signal to the diaphragm driving unit 112, the lens driving unit 115 and the imaging device control unit 119. The CPU/DSP 170 may control the overall operations of elements, which are included in the digital photographing apparatus 100, such as a shutter and a flash.

The manipulation unit 180 is an element in which a user may input a control signal. The manipulation unit 180 may include a shutter-release button, a power source button, a wide-zoom button, a telephoto-zoom button, and various function buttons. The shutter-release button is one for inputting a shutter-release signal that allows a photo to be photographed by exposing the imaging device 118 to light for a predetermined time. The power source button is one that inputs a control signal for controlling the turn-on/off of a power source. The wide-zoom button and the telephoto-zoom button are for zooming out or zooming in an angle of view according to inputs. The function buttons are for selecting modes such as a character input mode, a photographing mode and a playback mode, selecting a white balance setting function, and selecting an exposure setting function. The manipulation unit 180 may be implemented in all types in which a user can input a control signal, like a button, a keyboard, a touch pad, a touch screen or a remote controller.

The sensor unit 190 senses the motion or orientation of the digital photographing apparatus 100. The sensor unit 190 may sense the motion of the digital photographing apparatus 100 to detect a user's gesture. The user's gesture detected through the sensor unit 190 may be rolling, pitching, yawing or transition. The sensor unit 190, for example, may be implemented with various kinds of sensors, which may sense the motion or orientation of the digital photographing apparatus 100, such as a gyro sensor, a tilt sensor and an acceleration sensor.

Figure 2A:
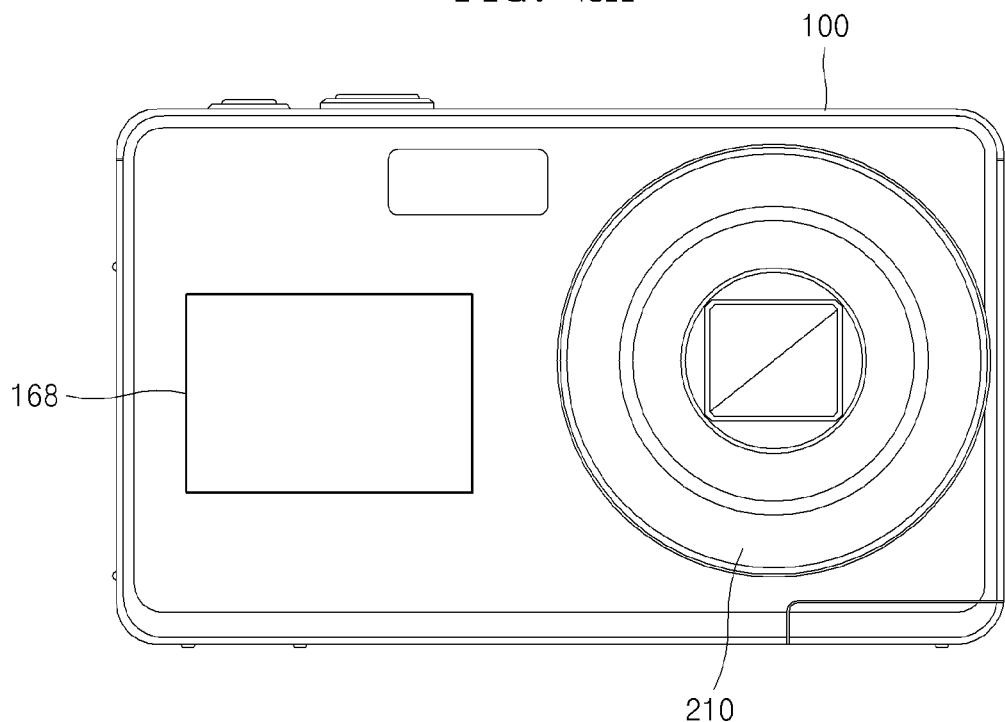
FIG. 2A is a diagram illustrating a second display unit, according to an embodiment.
Figure 2B:
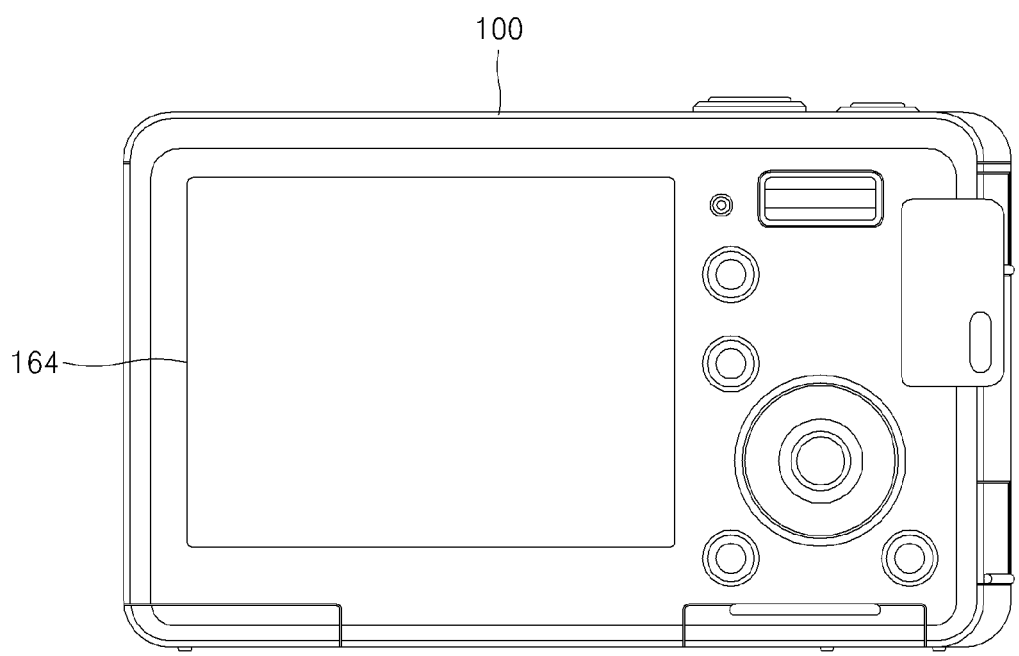
FIG. 2B is a diagram illustrating a first display unit, according to an embodiment.

FIG. 2A is a diagram illustrating the second display unit 168, according to an embodiment. FIG. 2B is a diagram illustrating the first display unit 164, according to an embodiment.

As illustrated in FIGS. 2A and 2B, in the digital photographing apparatus 100, the second display unit 168 may be disposed at the front surface of the digital photographing apparatus 100 in which a lens barrel 210 is disposed, and the first display unit 164 may be disposed at the rear surface of the digital photographing apparatus 100. Accordingly, the second display unit 168 is disposed in the direction visible to the person photographed.

Figure 3:
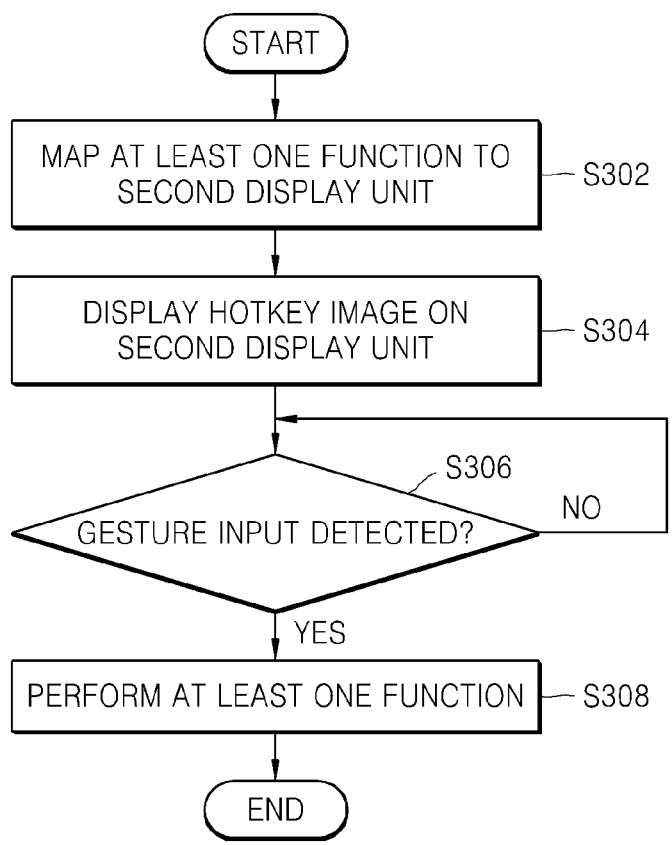
FIG. 3 is a flow chart illustrating a method for controlling a digital photographing apparatus, according to an embodiment.
Figure 4A:
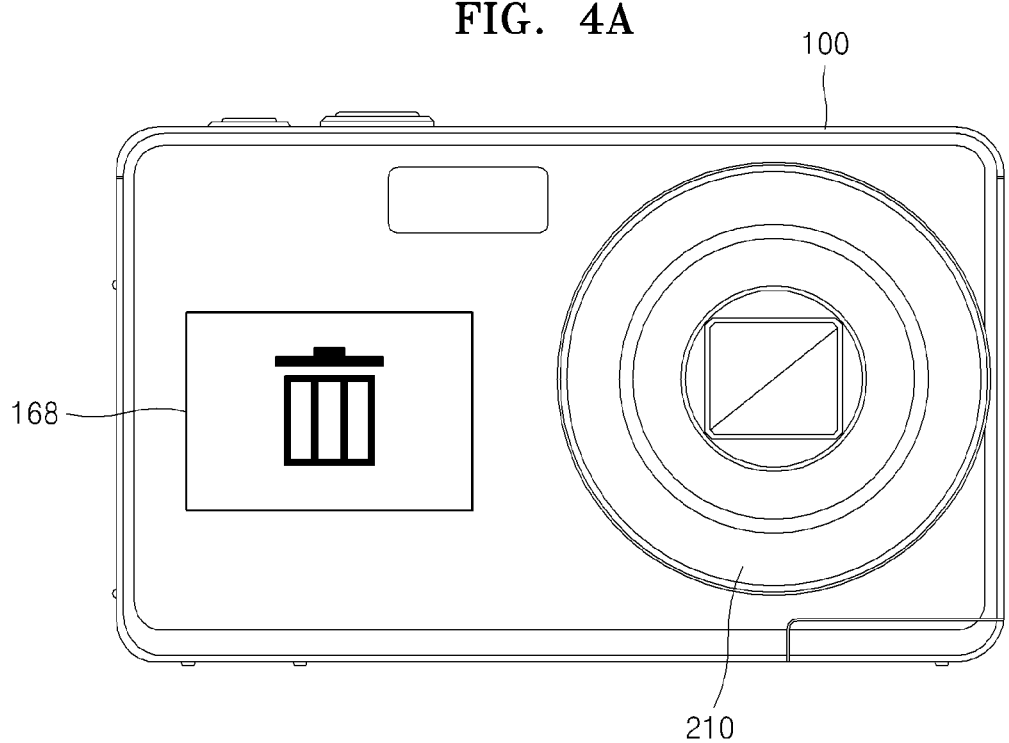
FIGS. 4A, 4B, 4C, and 4D are diagrams illustrating the digital photographing apparatus on which an exemplary hotkey image is displayed.
Figure 4B:
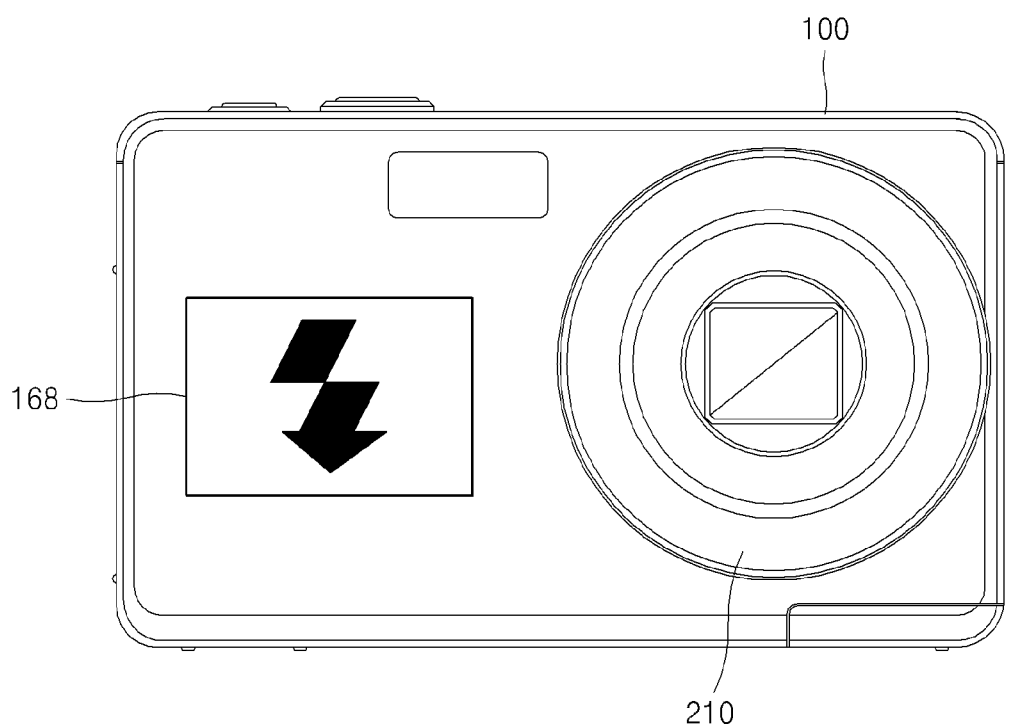
Figure 4C:
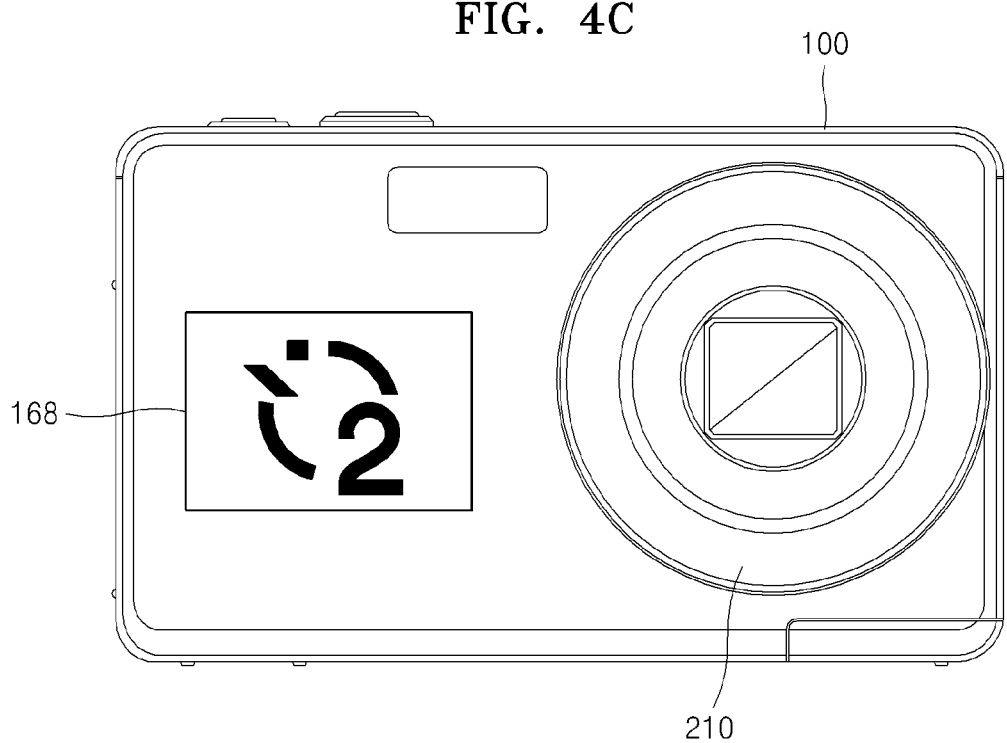
Figure 4D:
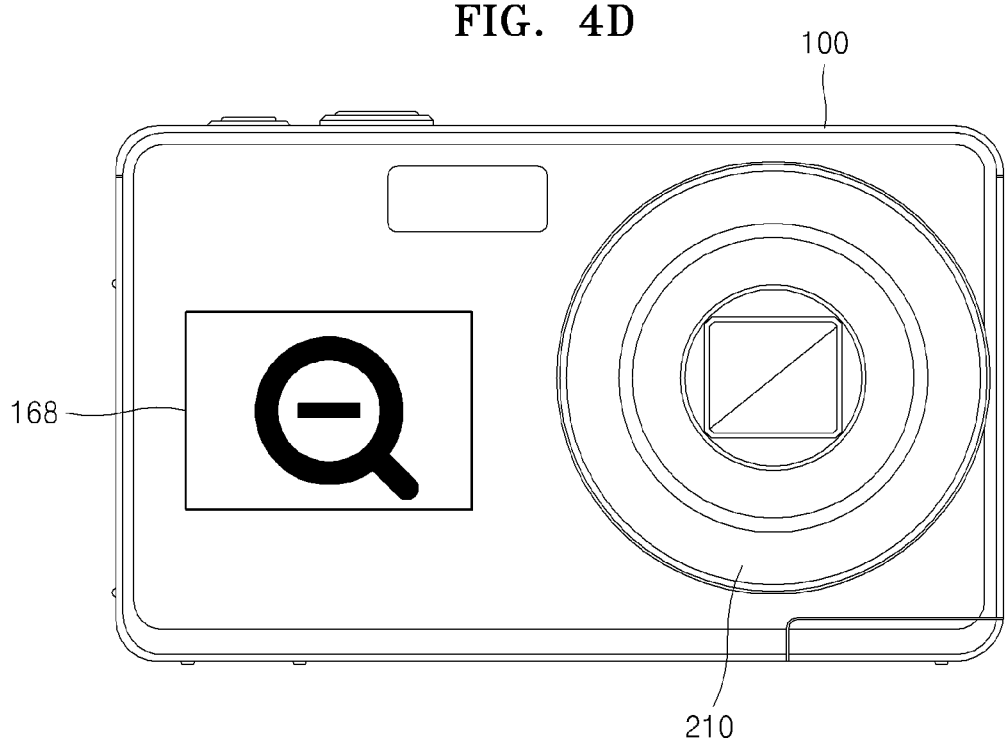

FIG. 3 is a flow chart illustrating a method for controlling the digital photographing apparatus 100, according to an embodiment. According to an embodiment, by mapping at least one function to the second display unit 168, the digital photographing apparatus 100 facilitates the user to perform the function mapped to the second display unit 168 by the simple input of a gesture.

First, in the method for controlling the digital photographing apparatus 100 according to an embodiment, at least one function is mapped to the second display unit 168 in operation S302. Herein, mapping at least one function to the second display unit 168 denotes that the second display unit 168 is only used for a specific function although the first display unit 164 operates in all kinds of modes such as a photographing mode, a playback mode and a setting mode. As a result, the second display unit 168 operates as a user interface capable of immediately reacting to the input of a user's gesture.

The at least one function to be mapped to the second display unit 168 may be determined automatically or by a user's selection. As an example, the at least one function to be mapped to the second display unit 168 may be determined according to the operation mode of the first display unit 164. For example, when the first display unit 164 operates in a general photographing mode, a shutter-release input function may be mapped to the second display unit 168, and when the first display unit 164 operates in a self-timer photographing mode, a timer setting function may be mapped to the second display unit 168.

At least one function to be mapped to the second display unit 168 may be selected from among various functions that are provided from the digital photographing apparatus 100. For example, the at least one function may be playback image deletion, playback image zooming out, playback image zooming in, playback image change, flash turn-on/off control, self-timer control, zoom in, zoom out, half-shutter input and shutter-release input.

When at least one function is mapped to the second display unit 168 in operation S302, the second display unit 168 displays a hotkey image corresponding to the at least one function in operation S304. The hotkey image may be mapped to each function and be pre-stored in the data storage unit 142.

FIGS. 4A, 4B, 4C, and 4D are diagrams illustrating the digital photographing apparatus 100 on which an exemplary hotkey image is displayed. As illustrated in FIGS. 4A through 4D, a hotkey image is displayed on the entire screen of the second display unit 168, and thus a user can easily recognize which function is mapped to the second display unit 168. The second display unit 168 may display a playback image deletion hotkey image (see FIG. 4A), a flash on/off hotkey image (see FIG. 4B), a timer setting function hotkey image (see FIG. 4C) and a zoom-out hotkey image (see FIG. 4D), according to at least one function that is currently set.

Next, in the method for controlling the digital photographing apparatus 100 according an embodiment, a gesture input is detected in operation S306. The input type of gesture may be pre-defined or selected by a user.

Figure 5:
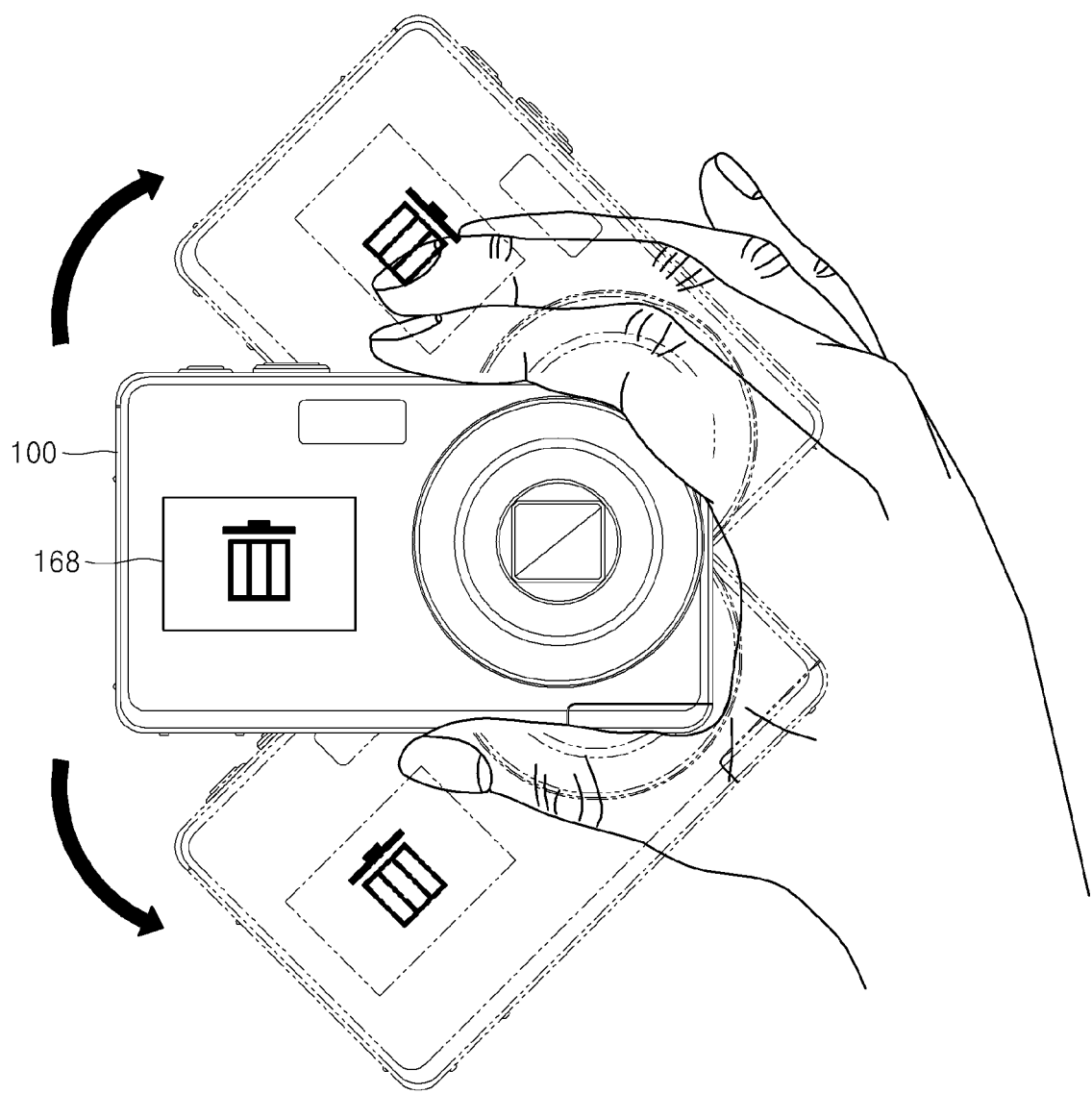
FIG. 5 illustrates an exemplary yawing type of gesture input in which the digital photographing apparatus is shaken.

As an example of the gesture input, the gesture input may be a motion of pre-defined type of the digital photographing apparatus 100. For example, the gesture input may be at least one of the rolling, pitching, yawing and transition of the digital photographing apparatus 100 or the combination of these. The rolling, pitching, yawing and transition of the digital photographing apparatus 100 are sensed by the sensor unit 190. The speed, acceleration, direction and orientation of the gesture input sensed by the sensor unit 190 may be pre-determined. FIG. 5 illustrates an exemplary yawing type of gesture input in which the digital photographing apparatus 100 is shaken. As illustrated in FIG. 5, by shaking the digital photographing apparatus 100, a user may perform controlling to perform a function mapped to the second display unit 168.

Figure 6:
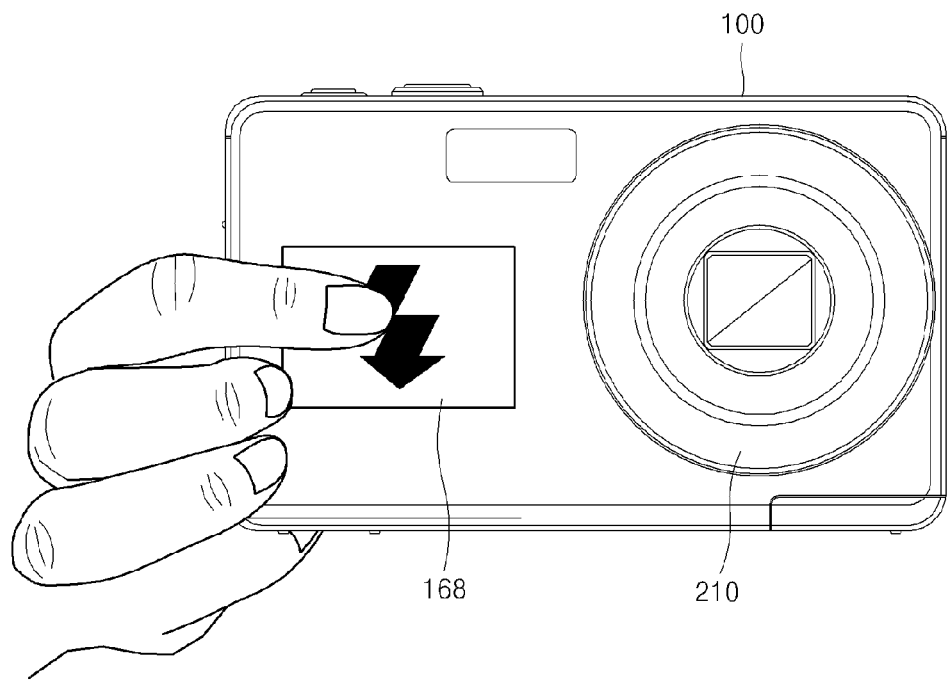
FIG. 6 is a diagram illustrating an exemplary certain or higher-level pressure type of gesture input which is performed through the second display unit.

As another example, the gesture input may be pressure that presses the second display unit 168 at a certain or higher level. In this case, the second display unit 168 may include a pressure sensor. FIG. 6 is a diagram illustrating an exemplary certain or higher-level pressure type of gesture input which is performed through the second display unit 168. As illustrated in FIG. 6, a user presses the second display unit 168 at a certain or higher level for longer than a certain time in a state where the digital photographing apparatus 100 is being held in the user's hand, and thereby controls the digital photographing apparatus 100 in order to perform a certain function mapped to the second display unit 168. The gesture input is an input type in which a gesture can be easily input without changing a position of a user's hand in a state where the digital photographing apparatus 100 is being held in the user's hand, and the digital photographing apparatus 100 can give a good sense of grip to a user when inputting the gesture. That is, as illustrated in FIG. 6, when a flash on function is mapped to the second display unit 168, a user may control the flash on function by simply pressing the second display unit 168 while photographing a subject.

Figure 7:
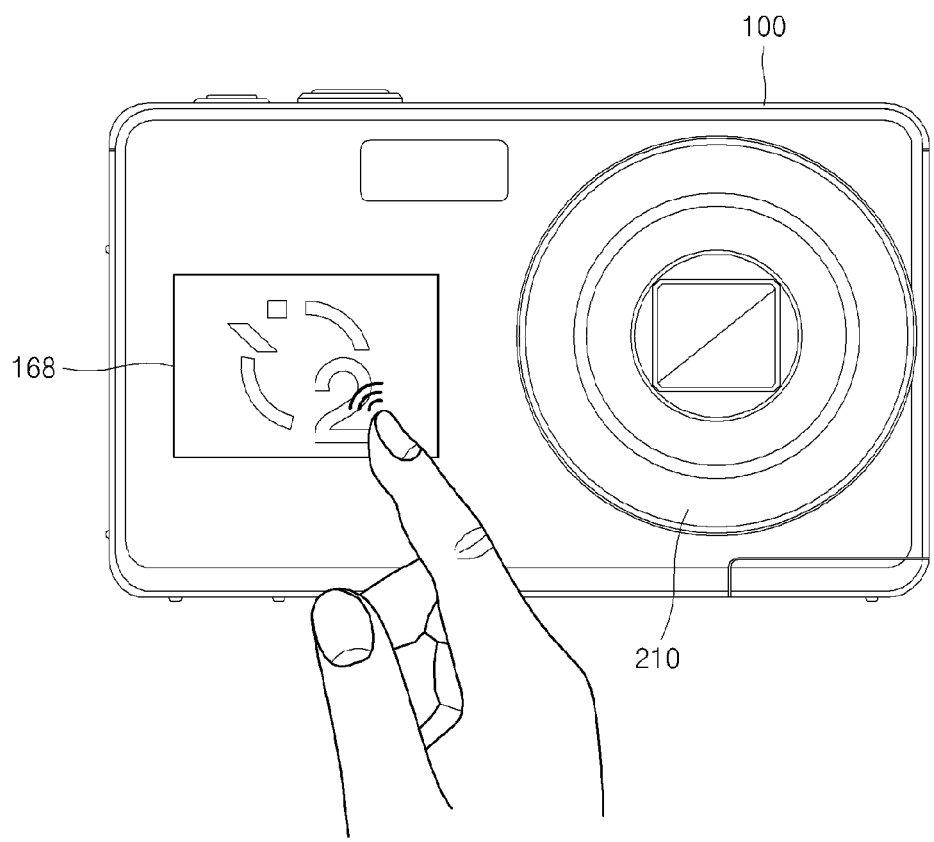
FIG. 7 is a diagram illustrating an exemplary tapping type of gesture input which is performed through the second display unit.

As another example, the gesture input may be a touch screen input through the second display unit 168. In this case, the second display unit 168 may be implemented with a touch screen. FIG. 7 is a diagram illustrating an exemplary tapping type of gesture input which is performed through the second display unit 168. For example, as illustrated in FIG. 7, the gesture input may be an input in which a user taps the second display unit 168, and a number of tapping times for performing a function mapped to the second display unit 168 may be pre-defined.

When a pre-defined type of gesture input is detected in operation S306, the at least one function mapped to the second display unit 168 is performed in operation S308. For example, as illustrated in FIG. 5, in a case where a playback image deletion function is mapped to the second display unit 168, an image that is currently being played back on the first display unit 164 may be deleted when shaking the digital photographing apparatus 100 at a pre-defined speed or acceleration or faster.

Figure 8:
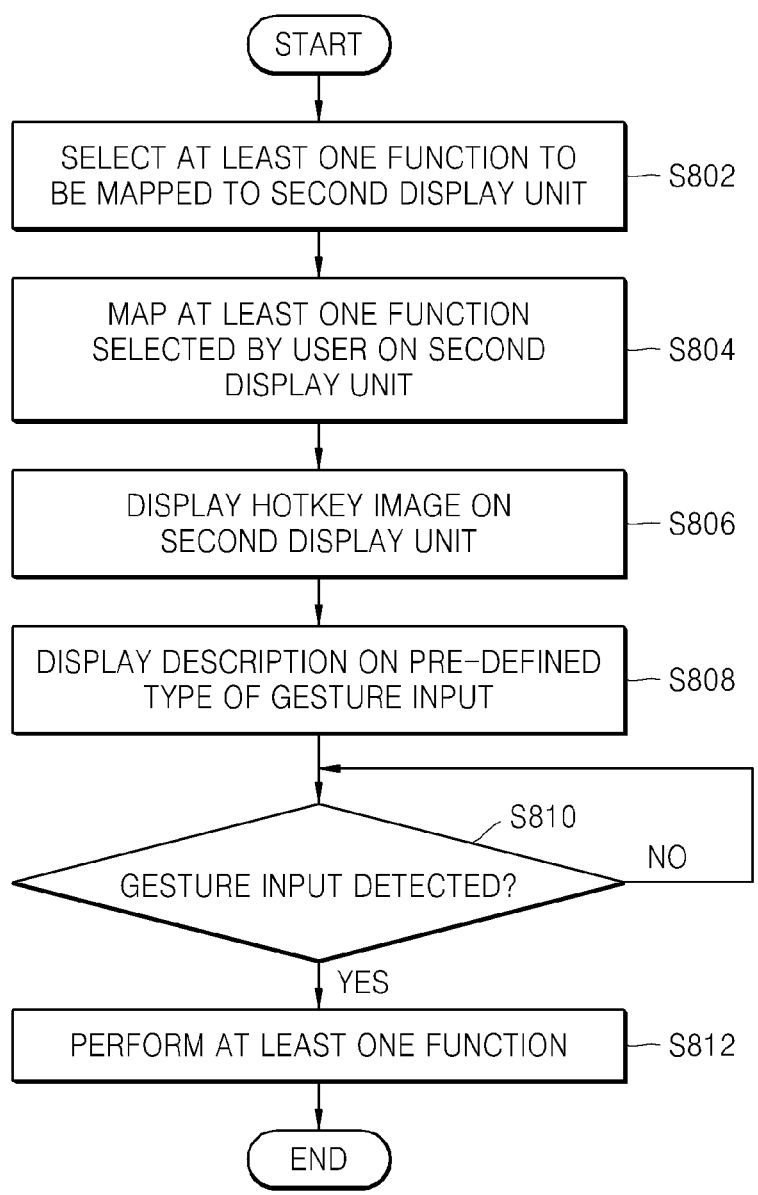
FIG. 8 is a flow chart illustrating a method for controlling digital photographing apparatus, according to another embodiment.

FIG. 8 is a flow chart illustrating a method for controlling the digital photographing apparatus 100, according to another embodiment. According to the embodiment, the digital photographing apparatus 100 includes a User Interface (UI) in which a user may select a function to be mapped to the second display unit 168. Moreover, the first display unit 164 or the second display unit 168 displays a description of the pre-defined type of the gesture input.

First, in the method for controlling the digital photographing apparatus 100 according to another embodiment, a user selects at least one function to be mapped to the second display unit 168 through a user interface in operation S802. The user interface may be provided through at least one of the first and second display units 164 and 168.

FIG. 9 is a diagram illustrating an exemplary form of a user interface which may select at least one function to be mapped to the second display unit 168. As an example of a user interface, as illustrated in FIG. 9, the first display unit 164 displays a list of functions that may be mapped to the second display unit 168. A user may select a function to be mapped to the second display 168 from among the functions that are displayed on the first display unit 164.

Subsequently, the user maps at least one function, which is selected through the user interface, to the second display unit 168 in operation S804, and the second display unit 168 displays a hotkey image in operation S806. As illustrated in FIG. 9, when the user selects an icon 910, representing a playback image deletion function, as a function to be mapped to the second display unit 168 through the user interface, the playback image deletion function is mapped to the second display unit 168, and a playback image deletion hotkey image is displayed on the second display unit 168.

Figure 10A:
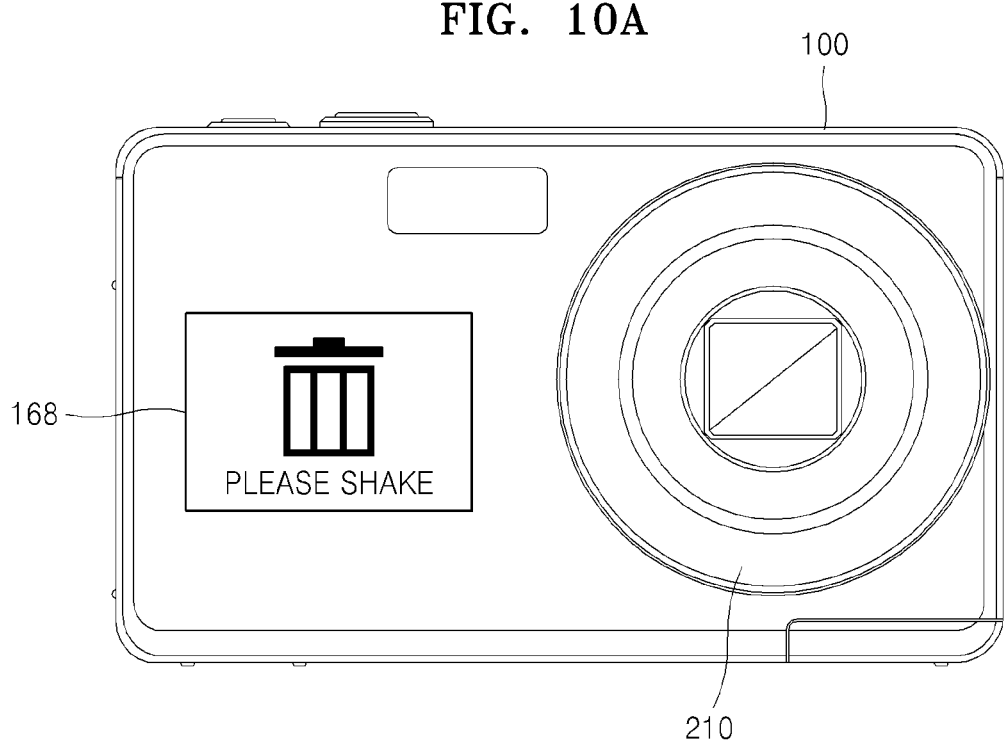
FIGS. 10A and 10B are diagrams illustrating a form in which the second display unit displays a description on a gesture input, according to another embodiment.
Figure 10B:
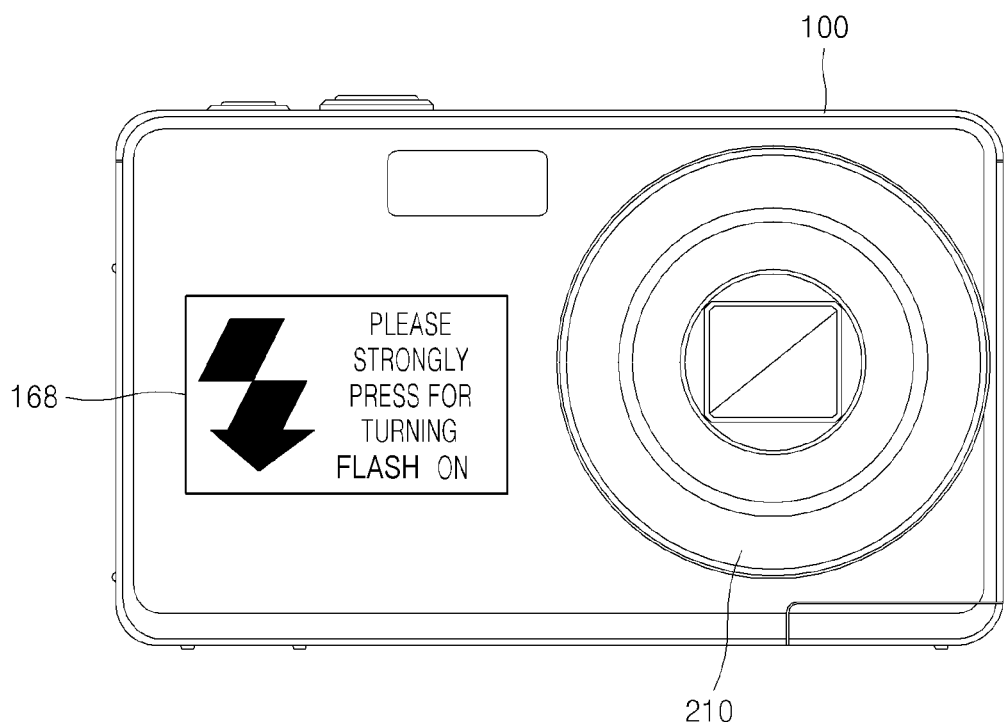

FIGS. 10A and 10B are diagrams illustrating a form in which the second display unit 168 displays a description of a gesture input, according to another embodiment. According to this embodiment, at least one of the first and second display units 164 and 168 may display a description of a gesture input that facilitates a function mapped to the second display unit 168 to be performed in operation S808. The type of a gesture input may be pre-defined. In this embodiment, at least one of the first and second display units 164 and 168 displays a description of the type of gesture input that is defined, such that the user may easily recognize the information of the gesture input. For example, as illustrated in FIG. 10A, when the pre-defined type of the gesture input is the yawing input as illustrated in FIG. 5, the second display unit 168 may display a description of a gesture input, indicating "please shake," together with a hotkey image. Moreover, as illustrated in FIG. 10B, when the pre-defined type of the gesture input is a pressure equal to or higher than a certain level as illustrated in FIG. 6, the second display unit 168 may display a description of a gesture input, indicating "please strongly press for turning a flash on," together with a hotkey image.

Subsequently, when the gesture input is detected in operation S810, the at least one function mapped to the second display unit 168 is performed in operation S812.

Figure 11:
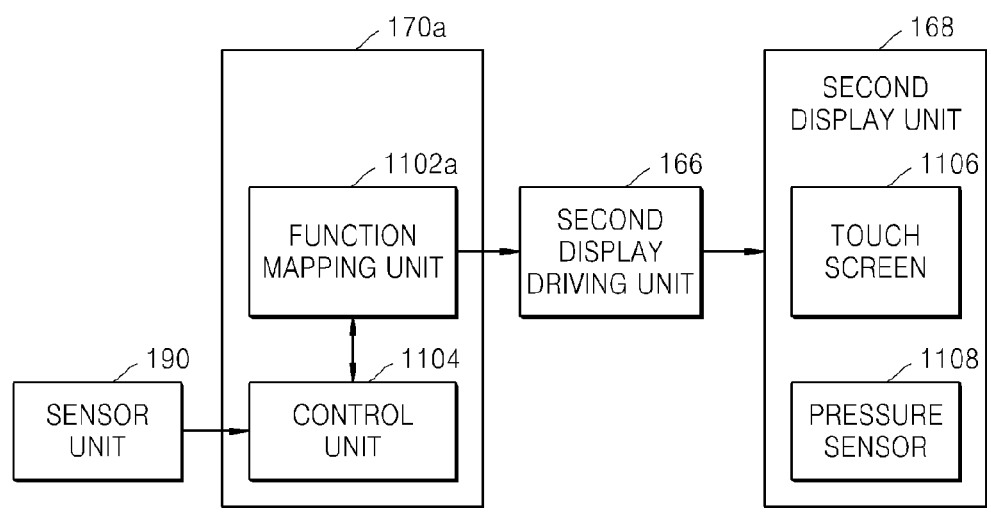
FIG. 11 is a block diagram illustrating a portion of the elements of the digital photographing apparatus, according to an embodiment.

FIG. 11 is a block diagram illustrating a portion of the elements of the digital photographing apparatus 100, according to an embodiment.

A CPU/DSP 170a according to an embodiment includes a function mapping unit 1102a and a control unit 1104. The function mapping unit 1102a maps at least one function to the second display 168 to display a hotkey image corresponding to the at least one function. For this, by outputting the hotkey image to the second display driving unit 166, the function mapping unit 1102a controls the second display unit 168 to display the hotkey image. Hotkey images corresponding to respective functions may be stored in the data storage unit 142, and the function mapping unit 1102a may read a hotkey image corresponding to a function mapped to the second display unit 168 from the data storage 142 to output the read image to the second display driving unit 166.

When a gesture input is detected, the control unit 1104 performs the at least one function mapped to the second display unit 168.

As an example, the gesture input may be a pre-defined type of motion of the digital photographing apparatus 100. For example, the gesture input may be at least one of the rolling, pitching, yawing and transition of the digital photographing apparatus 100 or the combination of these. The control unit 1104 monitors the motion of the digital photographing apparatus 100 that is sensed by the sensor unit 190 to detect a pre-defined gesture input. The speed, acceleration, direction and orientation of the gesture input sensed by the sensor unit 190 may be predetermined. FIG. 5 illustrates an exemplary yawing type of gesture input in which the digital photographing apparatus 100 is shaken. As illustrated in FIG. 5, by shaking the digital photographing apparatus 100, a user may perform a function mapped to the second display unit 168.

As another example, the gesture input may be pressure that presses the second display unit 168 at a certain or higher level. In this case, the second display unit 168 may include a pressure sensor. As illustrated in FIG. 6, a user presses the second display unit 168 at a certain or higher level for longer than a certain time in a state the digital photographing apparatus 100 is being held in the user's hand, and thereby controls the digital photographing apparatus 100 in order to perform a certain function mapped to the second display unit 168.

As another example, the gesture input may be a touch screen input through the second display unit 168. In this case, the second display unit 168 may be implemented with a touch screen. For example, as illustrated in FIG. 7, the gesture input may be an input in which a user taps the second display unit 168, and a number of tapping times for performing a function mapped to the second display unit 168 may be pre-defined.

The sensor unit 190, a touch screen 1106 or a pressure sensor 1108 may selectively be included in the digital photographing apparatus 100 according to each example of implementation.

Figure 12:
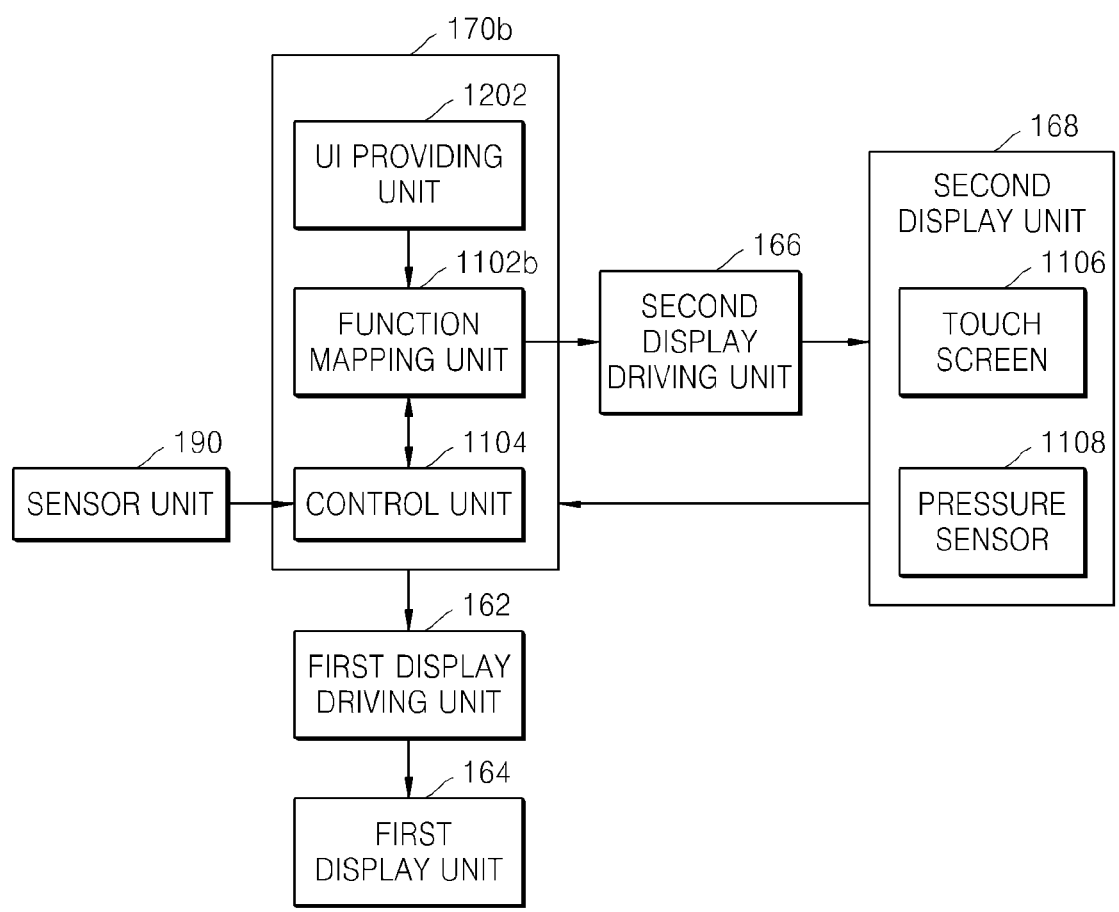
FIG. 12 is a block diagram illustrating a portion of the elements of the digital photographing apparatus, according to another embodiment.

FIG. 12 is a block diagram illustrating a portion of the elements of the digital photographing apparatus 100, according to another embodiment. A CPU/DSP 170b according to the embodiment of FIG. 12 includes a UI providing unit 1202, a function mapping unit 1102b, and a control unit 1104.

The UI providing unit 1202 provides a user interface through which a user may select at least one function to be mapped to the second display unit 168. The user interface may be provided through at least one of the first and second display units 164 and 168. The UI providing unit 1202 controls a first display driving unit 162 or a second display driving unit 166 to display a user interface screen on the first display unit 164 or the second display unit 168, for displaying the user interface. For example, as illustrated in FIG. 9, the user interface screen may be displayed on the first display unit 164.

The function mapping unit 1102b maps at least one function, which is selected by the user through the user interface, to the second display unit 168, and displays a hotkey function on the second display unit 168. As illustrated in FIG. 9, when the user selects an icon 910, representing a playback image deletion function, as a function to be mapped to the second display unit 168 through the user interface, the playback image deletion function is mapped to the second display unit 168, and a playback image deletion hotkey image is displayed on the second display unit 168.

Moreover, the function mapping unit 1102b may display a description of a gesture input that facilitates a function mapped to the second display unit 168 to be performed on at least one of the first and second display units 164 and 168. For example, as illustrated in FIGS. 10A and 10B, a description of the gesture input may be displayed together with the hotkey image on the second display unit 168.

When a gesture input is detected, the control unit 1104 performs the at least one function mapped to the second display unit 168.

According to various embodiments, the digital photographing apparatus 100 displays a function that may be performed by a gesture input on the second display unit and performs a specific function in response to the gesture input of the user, thereby facilitating the user to easily perform the specific function without complicated manipulation.

According to various embodiments, moreover, the digital photographing apparatus 100 displays a function that may be performed by a gesture input on the second display unit, and thus the user may easily check which function may be performed by a current gesture input.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

Also, using the disclosure herein, programmers of ordinary skill in the art to which the invention pertains can easily implement functional programs, codes, and code segments for making and using the invention.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A method for controlling a digital photographing apparatus which includes first and second display units, the method comprising:
    mapping at least one function to the second display unit, wherein the mapping is triggered by a determination of the at least one function on the first display unit without reconfiguring positions of the first and second display units; and
    performing the at least one function mapped to the second display unit in response to a gesture input,
    wherein:
    the at least one function mapped to the second display unit is a photographing control function, and
    the second display unit is disposed on a front surface of a body of the digital photographing apparatus in which a lens barrel is disposed.

2. The method of claim 1, further comprising providing a user interface through which a user selects the at least one function mapped to the second display unit among a plurality of functions of the digital photographing apparatus.

3. The method of claim 1, further comprising displaying a hotkey image, which represents the at least one function, on the second display unit.

4. The method of claim 1, further comprising displaying a description of a pre-defined type of the gesture input for performing the at least one function, on at least one of the first and second display units.

5. The method of claim 1, further comprising displaying information of a function mapped to the second display unit on the first display unit.

6. The method of claim 1, wherein the gesture input includes at least one of a pre-defined type of touch screen input which is input to the second display unit, a certain or higher level of pressure which is applied to the second display unit, and a pre-defined type of motion of the digital photographing apparatus.

7. The method of claim 1, wherein the at least one function includes at least one of playback image deletion, playback image zooming out, playback image zooming in, playback image change, flash turn-on/off control, self-timer control, zoom in, zoom out, half-shutter button press input, and shutter-release input.

8. A method for controlling a digital photographing apparatus which includes first and second display units, the method comprising:
mapping at least one function to the second display unit, wherein the mapping is triggered by a determination of the at least one function on the first display unit; and
performing the at least one function mapped to the second display unit in response to a gesture input;
wherein:
the second display unit is disposed on a front surface of a body of the digital photographing apparatus in which a lens barrel is disposed, and
the first display unit is disposed on a back surface of the body of the digital photographing apparatus.

9. A digital photographing apparatus, comprising:
a photographing unit that generates an electrical signal from incident light to photograph a subject;
a first display unit;
a second display unit;
a function mapping unit that maps at least one function to the second display unit triggered by a determination of the at least one function on the first display unit without a reconfiguration of positions of the first and second display units; and
a controller that performs the at least one function mapped to the second display unit in response to a gesture input,
wherein:
the at least one function mapped to the second display unit is a photographing control function, and
the second display unit is disposed on a front surface of a body of the digital photographing apparatus in which a lens barrel is disposed.

10. The digital photographing apparatus of claim 9, further comprising a user interface providing unit that provides a user interface through which a user selects the at least one function mapped to the second display unit among a plurality of functions of the digital photographing apparatus.

11. The digital photographing apparatus of claim 9, wherein the function mapping unit displays a hotkey image, which represents the at least one function, on the second display unit.

12. The digital photographing apparatus of claim 9, wherein the function mapping unit displays a description of a pre-defined type of the gesture input for performing the at least one function, on at least one of the first and second display units.

13. The digital photographing apparatus of claim 9, wherein the function mapping unit displays information of a function, which is mapped to the second display unit, on the first display unit.

14. The digital photographing apparatus of claim 9, wherein:
the second display unit includes a touch screen, and
the gesture input is a pre-defined type of touch screen input which is input to the second display unit.

15. The digital photographing apparatus of claim 9, wherein:
the second display unit comprises a pressure sensor, and
the gesture input is a certain or higher level of pressure which is applied to the second display unit.

16. The digital photographing apparatus of claim 9, further comprising a motion sensor that senses a motion of the digital photographing apparatus,
wherein the gesture input is a pre-defined type of motion of the digital photographing apparatus.

17. The digital photographing apparatus of claim 9, wherein the at least one function is at least one of playback image deletion, playback image zooming out, playback image zooming in, playback image change, flash turn-on/off control, self-timer control, zoom in, zoom out, half-shutter button press input and shutter-release input.

18. A digital photographing apparatus comprising:
a photographing unit that generates an electrical signal from incident light to photograph a subject;
a second display unit that is disposed on a front surface of a body of the digital photographing apparatus in which a lens barrel is disposed;
a first display unit that is disposed on a back surface of the body of the digital photographing apparatus;
a function mapping unit that maps at least one function to the second display unit triggered by a determination of the at least one function on the first display unit; and
a controller that performs the at least one function mapped to the second display unit in response to a gesture input.

19. A non-transitory computer-readable storage medium that has stored thereon a program executable by a processor for performing a method of controlling a digital photographing apparatus which includes first and second display units, the method comprising:
mapping at least one function to the second display unit, wherein the mapping is triggered by a determination of the at least one function on the first display unit without reconfiguring positions of the first and second display units; and
performing the at least one function mapped to the second display unit in response to a gesture input,
wherein:
the at least one function mapped to the second display unit is a photographing control function, and
the second display unit is disposed on a front surface of a body of the digital photographing apparatus in which a lens barrel is disposed.

20. The non-transitory computer-readable storage medium of claim 19, wherein the method further comprises providing a user interface through which a user selects the at least one function mapped to the second display unit among a plurality of functions of the digital photographing apparatus.

21. The non-transitory computer-readable storage medium of claim 19, wherein the method further comprises displaying a hotkey image, which represents the at least one function, on the second display unit.

22. The non-transitory computer-readable storage medium of claim 19, wherein the method further comprises displaying a description of a pre-defined type of the gesture input for performing the at least one function, on at least one of the first and second display units.

23. The non-transitory computer-readable storage medium of claim 19, wherein the gesture input includes at least one of a pre-defined type of touch screen input which is input to the second display unit, a certain or higher level of pressure which is applied to the second display unit, and a pre-defined type of motion of the digital photographing apparatus.

24. The non-transitory computer-readable storage medium of claim 19, wherein the at least one function is at least one of playback image deletion, playback image zooming out, playback image zooming in, playback image change, flash turn-on/off control, self-timer control, zoom in, zoom out, half-shutter button press input and shutter-release input.

25. The non-transitory computer-readable storage medium of claim 19, wherein:
the second display unit is disposed at a front surface of the digital photographing apparatus in which a lens barrel is disposed, and
the first display unit is disposed at a rear surface of the digital photographing apparatus.

26. The non-transitory computer-readable storage medium of claim 19, wherein the computer program further comprises displaying information of a function mapped to the second display unit on the first display unit.

27. A method for controlling a digital photographing apparatus which includes first and second display units, the method comprising:
determining at least one function to be mapped to the second display unit, based on an operation mode of the first display unit; and
mapping the at least one function to the second display unit, wherein the mapping is triggered by the determining of the at least one function without reconfiguring positions of the first and second display units,
wherein:
the at least one function mapped to the second display unit is a photographing control function, and
the second display unit is disposed on a front surface of a body of the digital photographing apparatus in which a lens barrel is disposed.

28. The method of claim 27, further comprising performing the at least one function in response to a gesture input.

29. The method of claim 27, further comprising displaying a hotkey image, which represents the at least one function, on the second display unit.

30. The method of claim 27, wherein the determining of the at least one function determines a shutter-release function to be mapped to the second display unit, when the first display unit operates in a photographing mode.

31. The method of claim 27, wherein the determining of the at least one function determines a timer setting function to be mapped to the second display unit, when the first display unit operates in a self-timer photographing mode.

32. A method for controlling a digital photographing apparatus which includes first and second display units, the method comprising:
determining at least one function to be mapped to the second display unit, based on an operation mode of the first display unit; and
mapping the at least one function to the second display unit, wherein the mapping is triggered by the determining of the at least one function;
wherein:
the second display unit is disposed on a front surface of a body of the digital photographing apparatus in which a lens barrel is disposed, and
the first display unit is disposed on a back surface of the body of the digital photographing apparatus.

33. A digital photographing apparatus, comprising:
a photographing unit that generates an electrical signal from incident light to photograph a subject;
a first display unit;
a second display unit;
a function determination unit that determines at least one function to be mapped to the second display unit, based on an operation mode of the first display unit; and
a function mapping unit that maps the at least one function to the second display unit triggered by the determination of the at least one function without a reconfiguration of positions of the first and second display units,
wherein:
the at least one function mapped to the second display unit is a photographing control function, and
the second display unit is disposed on a front surface of a body of the digital photographing apparatus in which a lens barrel is disposed.

34. The digital photographing apparatus of claim 33, further comprising a control unit that performs the at least one function in response to a gesture input.

35. The digital photographing apparatus of claim 33, wherein the function mapping unit displays a hotkey image, which represents the at least one function, on the second display unit.

36. The digital photographing apparatus of claim 33, wherein the function determination unit determines a shutter-release function to be mapped to the second display unit, when the first display unit operates in a photographing mode.

37. The digital photographing apparatus of claim 33, wherein the function determination unit determines a timer setting function to be mapped to the second display unit, when the first display unit operates in a self-timer photographing mode.

38. A digital photographing apparatus comprising:
a photographing unit that generates an electrical signal from incident light to photograph a subject;
a second display unit that is disposed on a front surface of a body of the digital photographing apparatus in which a lens barrel is disposed;
a first display unit that is disposed on a back surface of the body of the digital photographing apparatus;
a function determination unit that determines at least one function to be mapped to the second display unit, based on an operation mode of the first display unit; and
a function mapping unit that maps the at least one function to the second display unit triggered by the determination of the at least one function.

39. A non-transitory computer-readable storage medium that stores a program executable by a processor for performing a method of controlling a digital photographing apparatus which includes first and second display units, the method comprising:
determining at least one function to be mapped to the second display unit, based on an operation mode of the first display unit; and
mapping the at least one function to the second display unit, wherein the mapping is triggered by the determining of the at least one function without reconfiguring positions of the first and second display units,
wherein the at least one function mapped to the second display unit is a photographing control function, and
the second display is disposed on a front surface of a body of the digital photographing apparatus in which a lens barrel is disposed.

40. The non-transitory computer-readable storage medium of claim 39, wherein the method further comprises performing the at least one function in response to a gesture input.

41. The non-transitory computer-readable storage medium of claim 39, wherein the method further comprises displaying a hotkey image, which represents the at least one function, on the second display unit.

42. The non-transitory computer-readable storage medium of claim 39, wherein determining the at least one function includes determining a shutter-release function to be mapped to the second display unit, when the first display unit operates in a photographing mode.

43. The non-transitory computer-readable storage medium of claim 39, wherein determining the at least one function includes determining a timer setting function to be mapped to the second display unit, when the first display unit operates in a self-timer photographing mode.

44. The non-transitory computer-readable storage medium of claim 39, wherein:
- the second display unit is disposed at a front surface of the digital photographing apparatus in which a lens barrel is disposed, and
- the first display unit is disposed at a rear surface of the digital photographing apparatus.

* * * * *